United States Patent [19]

Sterk

[11] Patent Number: 4,844,274
[45] Date of Patent: Jul. 4, 1989

[54] PRESSURE VESSEL HAVING A CONNECTION STUB WITH A THERMAL PROTECTOR

[75] Inventor: Zvonimir Sterk, Erlangen, Fed. Rep. of Germany

[73] Assignee: Siemens Aktiengesellschaft, Munich, Fed. Rep. of Germany

[21] Appl. No.: 202,809

[22] Filed: Jun. 3, 1988

[30] Foreign Application Priority Data

Jun. 4, 1987 [DE] Fed. Rep. of Germany ....... 3718785

[51] Int. Cl.$^4$ ............................................. F16J 15/14
[52] U.S. Cl. ......................................... 220/3; 277/22; 122/365; 122/362; 122/19
[58] Field of Search ............................. 220/3, 3.1, 901; 277/22; 122/365, 362, 319

[56] References Cited

U.S. PATENT DOCUMENTS

| | | | |
|---|---|---|---|
| 2,203,357 | 10/1938 | Kerr | 122/365 |
| 2,331,932 | 5/1941 | Rowand | 122/365 |
| 2,388,177 | 10/1945 | Patterson | 122/365 |
| 4,035,232 | 7/1977 | Kube | 220/3 |
| 4,168,071 | 9/1979 | Jacobson et al. | |

Primary Examiner—Stephen Marcus
Assistant Examiner—Gilbert W. Reece
Attorney, Agent, or Firm—Herbert L. Lerner; Laurence A. Greenberg

[57] ABSTRACT

A pressure vessel assembly includes a pressure vessel with a vessel wall having a connection stub with a stub wall. A thermal protector for the connection stub in the form of a first tube extends substantially parallel to the stub wall. The first tube has an inner surface, one end disposed at the stub wall and another free end extending into the pressure vessel. Brackets are disposed on the inner surface of the tube between the other free end and the stub wall. A second tube extends into the connection stub beyond the one end of the first tube. The second tube has slits formed therein defining prongs therebetween connected to the brackets.

8 Claims, 2 Drawing Sheets

PRESSURE VESSEL HAVING A CONNECTION STUB WITH A THERMAL PROTECTOR

The invention relates to a pressure vessel having a vessel wall in which a connection stub is disposed, the connection stub being provided with a thermal protector in the form of a tube extending approximately parallel to the wall of the stub, one end of the tube beginning at the stub wall and the other free end of the tube extending into the vessel.

The purpose of a thermal protector of this kind, such as that shown in European Pat. No. 0 012 057, is to avoid thermal stresses in the pressure vessel caused by a medium entering through the stub at a substantially different temperature. In other words, the tube forms an annular chamber having a dead water zone, which acts as a means of thermal insulation. However, such a device still permits some stress to be introduced.

It is accordingly an object of the invention to provide a pressure vessel having a connection stub with a thermal protector, which overcomes the hereinafore-mentioned disadvantages of the heretofore-known devices of this general type and which introduces even fewer stresses, especially in the vicinity of the connection points. Such connection points, such as the starting point of the tube at the stub wall, are particularly hazardous or dangerous points.

With the foregoing and other objects in view there is provided, in accordance with the invention, a pressure vessel assembly, comprising a pressure vessel with a vessel wall having a connection stub with a stub wall, a thermal protector for the connection stub in the form of a first tube extending substantially parallel to the stub wall, the first tube having an inner surface, one end disposed or beginning at the stub wall and another free end extending into the pressure vessel, brackets disposed on the inner surface of the tube between the other free end and the stub wall, a second tube extending into the connection stub beyond the one end of the first tube, the second tube having slits formed therein defining prongs therebetween connected to the brackets.

In the invention, a kind of double thermal protector is created, in which the connection point between the first tube and the connection stub in particularly is covered by the second tube. On the other hand, the fastening point of the second tube is located in a less critical region. The device is also constructed in such a way that even with severe thermally induced movement, such as is triggered by especially great temperature differences, excessive stresses are not induced, because the prongs and bracket lend a certain resiliency.

In accordance with another feature of the invention, the connection stub has an inner surface, and the second tube has an end facing away from the brackets with an outer surface sealingly disposed against the inner surface of the connection stub. This is done in order to produce a dead water zone with only slight temperature fluctuations.

To this end, in accordance with a further feature of the invention, the end of the second tube is thickened. In accordance with an added feature of the invention, the thickened end has grooves formed therein, and there are provided sealing rings disposed in the grooves. The sealing rings may be round profile rings made from an easily deformable metal, such as authentic material.

In accordance with an additional feature of the invention, the prongs are disposed at a thickened end of the second tube. This also promotes a sealing off of the annular chamber that is desirable for thermal insulation. This feature furthermore facilitates fastening, as will be explained in detail below in connection with an exemplary embodiment.

In accordance with yet another feature of the invention, the first tube has a substantially equal length and diameter. This has proved to be particularly suitable for structures that have already been built. In any case, the value is an approximate value, because lengths of from 0.8 to 1.5 times the diameter can advantageously be used.

In accordance with yet a further feature of the invention, the second tube has a length equal to at least twice the diameter thereof. In any case, the length should be selected to be great enough so that it extends as far as the end of an optionally tapering region of the outer wall of the connection stub.

In accordance with a concomitant feature of the invention, the connection stub has an inner surface, and there are provided protrusions on the free end of the first tube guiding the free end of the first tube on the inner surface of the connection stub. This is done in order to dissipate severe hydraulic forces directly into the stub wall. The disposition of the protrusions on the first tube is more favorable than the disposition of the protrusions on the pressure vessel wall as described in European Pat. No. 0 012 057.

Other features which are considered as characteristic for the invention are set forth in the appended claims.

Although the invention is illustrated and described herein as constructed in a pressure vessel having a connection stub with a thermal protector, it is nevertheless not intended to be limited to the details shown, since various modifications and structural changes may be made therein without departing from the spirit of the invention and within the scope and range of equivalents of the claims.

The construction and method of operation of the invention however, together with additional objects and advantages thereof will be best understood from the following description of specific embodiments when read in connection with the accompanying drawings.

Figure 1:
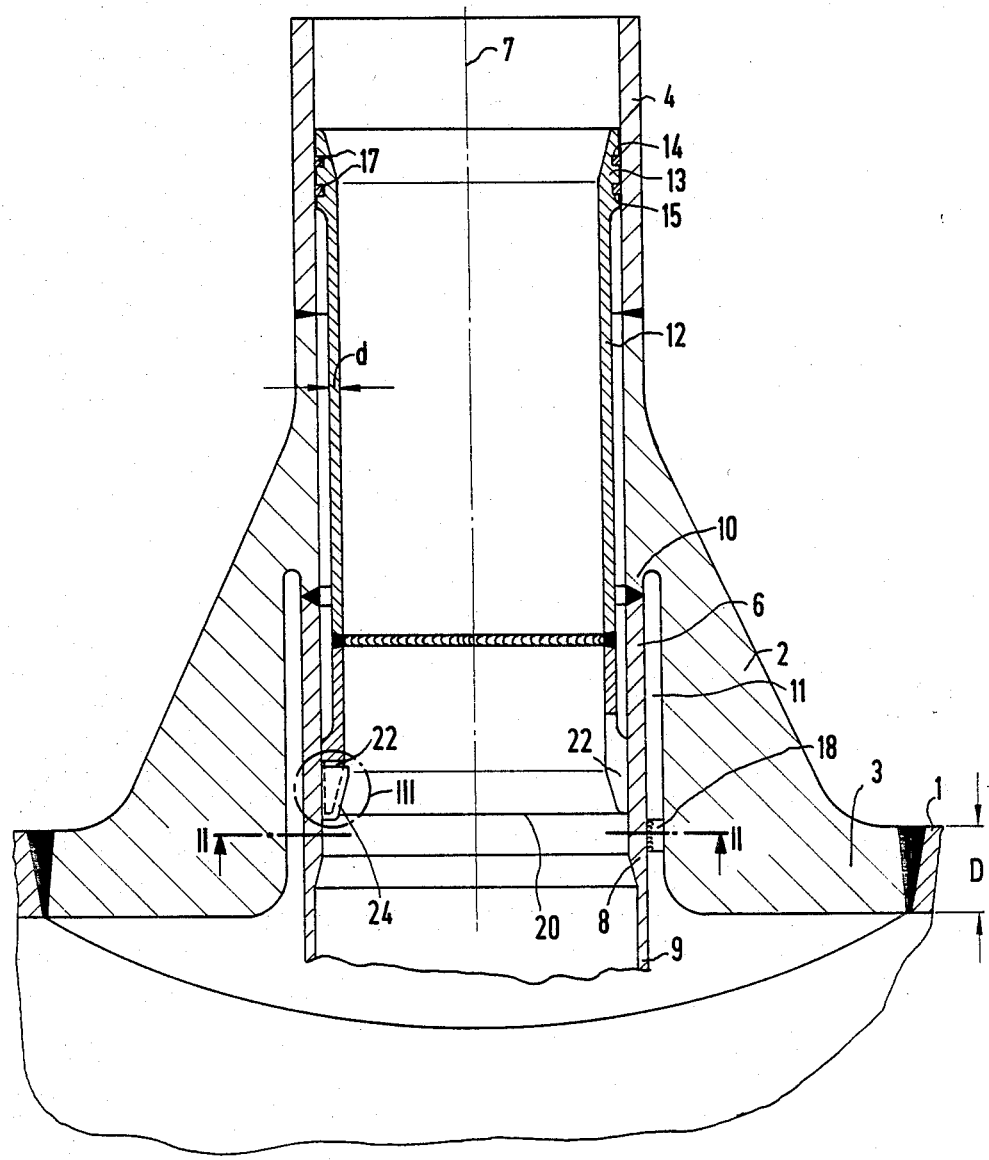
FIG. 1 is a fragmentary, diagrammatic, longitudinal-sectional view of a connection stub in a pressure vessel wall.

Referring now to the figures of the drawings in detail and first, particularly, to FIG. 1 thereof, there is seen a pressure vessel 1 which is a steam generator for a nuclear power plant. The pressure vessel 1 is a steel vessel that is approximately 4.5 m in diameter and has a wall thickness D of 12 cm, for example. A connection stub 2 is introduced into the vessel in such a way that one end of the stub forms part of a vessel wall 3. The connection stub 2 has an inside diameter of 42 cm and is intended for introducing feedwater, which is supplied through a feedwater line 4. Normally the feedwater has a temperature of approximately 200° C., while a temperature of approximately 300° C. prevails in the steam generator. In an emergency, even colder water, for example at room temperature (20° C. and below), can be fed into the steam generator 1 through the feedwater line 4.

As a thermal protector, the connection stub 2 has a first tube 6 which extends concentrically relative to the tube axis 7 in the extension of the line 4. The tube 6 extends toward the inside of the steam generator 1, where a distributor line 9 is welded onto the so-called free end 8 of the first tube. The other fixed end of the first tube 6 is defined by a starting point 10 at the wall or body of the connection stub 2, in which an annular chamber 11 is partitioned off. In order to absorb high hydraulic forces which may originate in the distributor line 9, four small blocks 18 are welded onto the outside of the tube 6. These blocks are protrusions which limit deflection against the inner wall of the connection stub 2.

A second tube 12 is provided as a further thermal protector in the line 4. The tube 12 has an inside diameter that is smaller than the stub 2 by approximately twice the wall thickness d of the tube 12, and the tube 12 is more than twice as long as the diameter of the tube 12. An end 13 of the second tube 12 which is located in the interior of the stub 2 is thickened, so that it rests on the inner wall surface of the line 4. Two rectangular grooves 14 and 15 are provided in the end 13 where it rests on the wall 4 and round profile rings 17 made from an easily deformable metal are disposed on the grooves. The rings 17 provide a tight closure between the inner wall surface of the line 14 and the protrusion formed of the thickened end 13.

Figure 2:
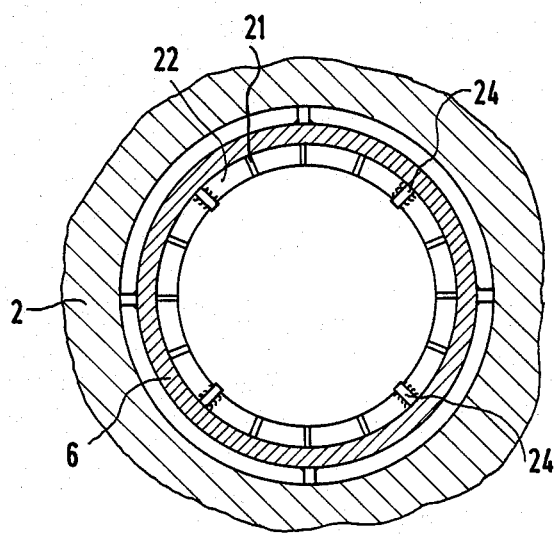
FIG. 2 is a fragmentary, cross-sectional view of the connection stub taken along the line II—II in FIG. 1, in the direction of the arrows.
Figure 3:
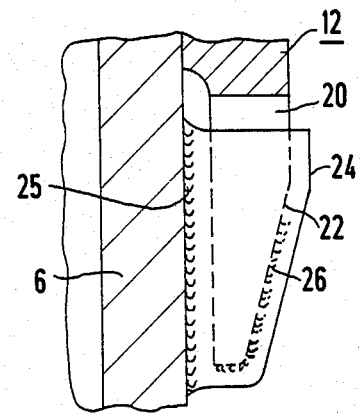
FIG. 3 is an enlarged view of the section III of FIG. 1, showing an embodiment of a fastening point between first and second tubes.

Another end 20 of the second tube 12 is also thickened, forming a protrusion that rests against the inner surface of the first tube 6. The tube 12 is slit at the end 20, as can be seen in FIGS. 2 and 3. Slits 21 extend over a multiple of the wall thickness of the tube 12 and form prongs 22. A total of eight of the prongs are provided with brackets 24, which are welded at uniform circumferential intervals to the inner surface of the first tube 6. A weld seam 25 is provided between the brackets and the first tube 6, while a weld seam 26 is provided between the brackets 24 and the prongs 22.

FIG. 1 clearly shows that the first tube 6 forms a first thermal protector for the vicinity of the connection stub 2. Additionally, the hazardous or dangerous region of the starting point 10 is covered with the second tube 12. Due to the welded connection between the brackets 24 and the prong 22, the tube 12 is attached so resiliently that in the event of radial expansions, the occurrence of impermissibly severe stresses is impossible. Axial expansions are freely permitted for both the first tube 6 and the second tube 12. Above all, however, the vulnerable connection at the starting point 10 between the first tube 6 and the connection stub 2 is shielded by the second tube 12.

The foregoing is a description corresponding in substance to German Application No. P 37 18 785.6, dated June 4, 1987, the International priority of which is being claimed for the instant application, and which is hereby made part of this application. Any material discrepancies between the foregoing specification and the aforementioned corresponding German application are to be resolved in favor of the latter.

I claim:

1. Pressure vessel assembly, comprising a pressure vessel with a vessel wall having a connection stub with a stub wall, a thermal protector for said connection stub in the form of a first tube extending substantially parallel to said stub wall, said first tube having an inner surface, one end disposed at said stub wall and another free end extending into said pressure vessel, brackets disposed on said inner surface of the said tube between said other free end and said stub wall, a second tube extending into said connection stub beyond said one end of said first tube, said second tube having slits formed therein defining prongs therebetween connected to said brackets.

2. Pressure vessel assembly according to claim 1, wherein said connection stub has an inner surface, and said second tube has an end facing away from said brackets with an outer surface sealingly disposed against said inner surface of said connection stub.

3. Pressure vessel assembly according to claim 1, wherein said end of said second tube is thickened.

4. Pressure vessel assembly according to claim 3, wherein said thickened end has grooves formed therein, and including sealing rings disposed in said grooves.

5. Pressure vessel assembly according to claim 1, wherein said prongs are disposed at a thickened end of said second tube.

6. Pressure vessel assembly according to claim 1, wherein said first tube has a substantially equal length and diameter.

7. Pressure vessel assembly according to claim 1, wherein said second tube has a length equal to at least twice the diameter thereof.

8. Pressure vessel assembly according to claim 1, wherein said said connection stub has an inner surface, and including protrusions on said free end of said first tube guiding said free end of said first tube on said inner surface of said connection stub.

* * * * *